Dec. 12, 1961 N. H. CASKIN 3,012,390
CLIPPER ATTACHMENT FOR POWER MOWERS
Filed Nov. 19, 1959 2 Sheets-Sheet 1
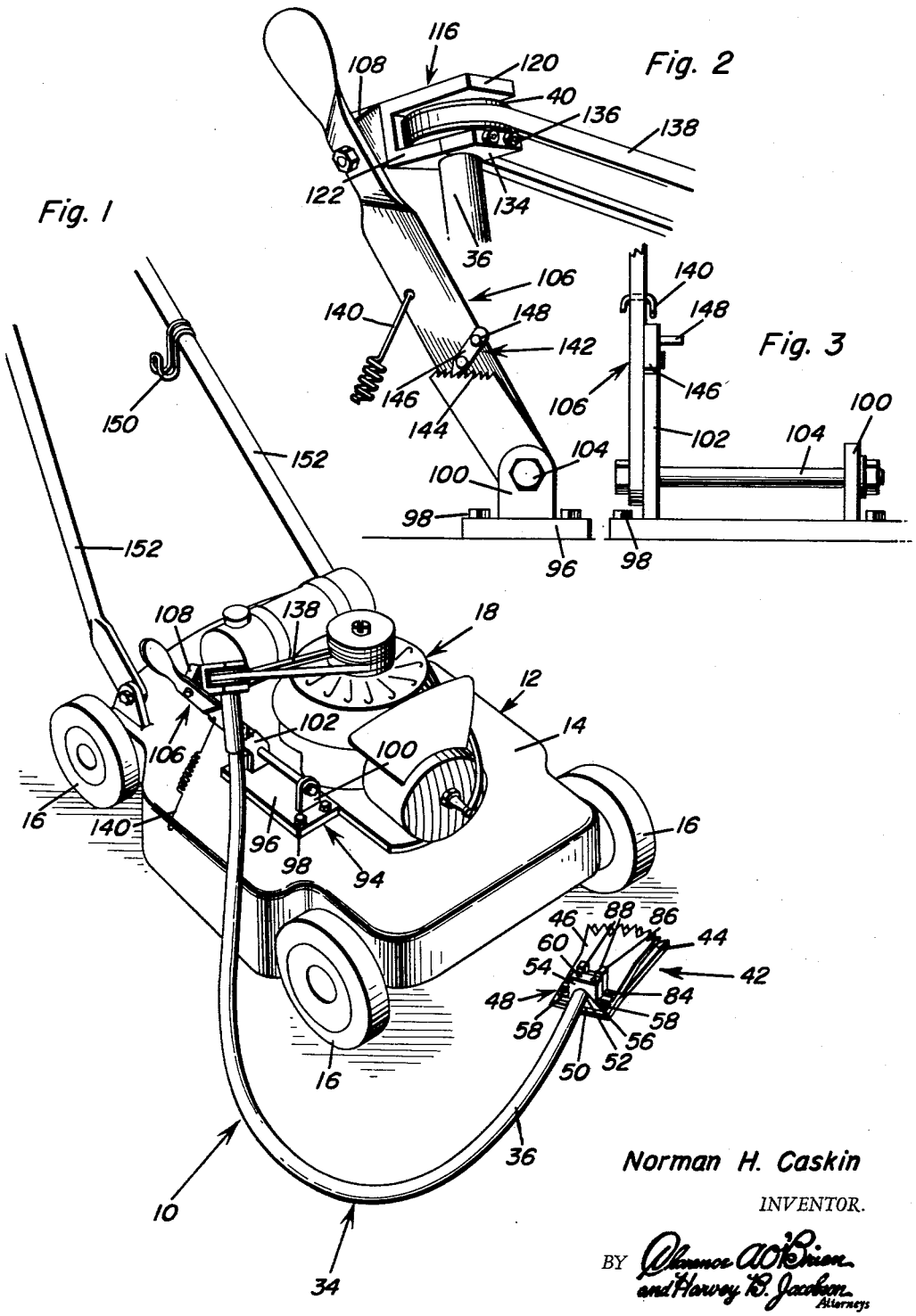
Norman H. Caskin
INVENTOR.

Dec. 12, 1961    N. H. CASKIN    3,012,390
CLIPPER ATTACHMENT FOR POWER MOWERS
Filed Nov. 19, 1959    2 Sheets-Sheet 2
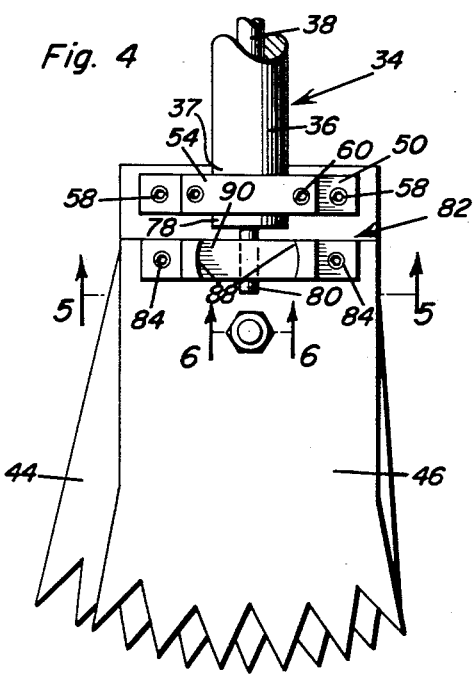
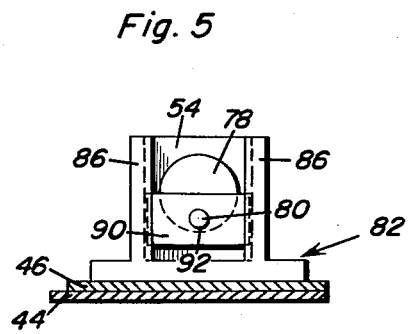
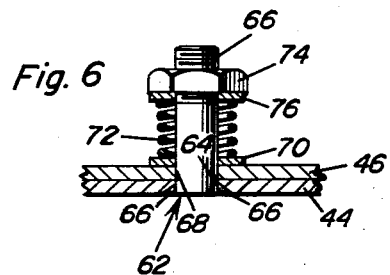
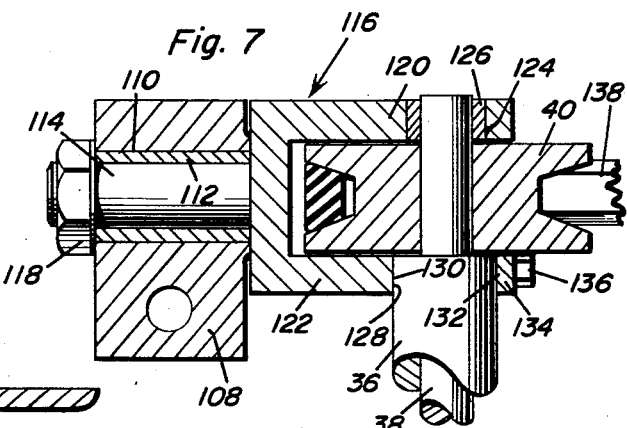
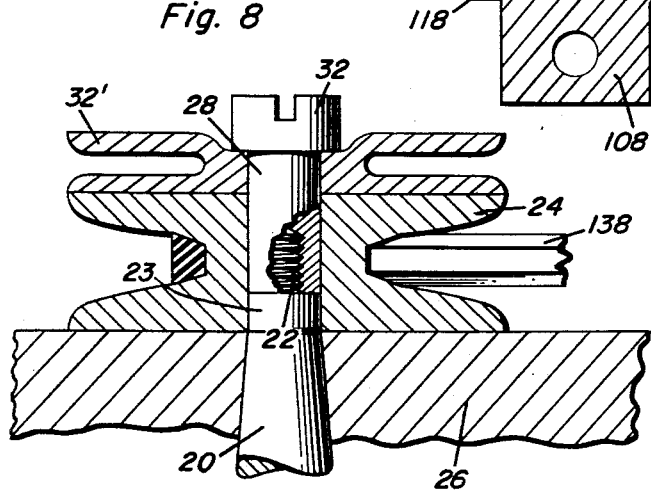
Norman H. Caskin
INVENTOR.

United States Patent Office 3,012,390
Patented Dec. 12, 1961

3,012,390
CLIPPER ATTACHMENT FOR
POWER MOWERS
Norman H. Caskin, 122 E. 6th St., Williamstown, W. Va.
Filed Nov. 19, 1959, Ser. No. 854,113
4 Claims. (Cl. 56—25.4)

This invention relates to a novel and useful clipper attachment for power mowers, and more particularly relates to a clipper attachment which is specifically adapted to be powered from the power take-off pulley of a power mower and is provided with a means whereby the attachment may be disengaged from the power take-off pulley.

The attachment utilizes a flexible shaft having a cutter head assembly mounted on one end thereof which comprises a pair of cutter blades with one of the blades being fixedly secured to the flexible shaft housing and the other cutter blade being pivotally secured to the rigidly mounted cutter blade for oscillating movement relative thereto and operatively connected to the core of the flexible shaft by means of a pin and slot connection. The other end of the flexible cable is provided with an input pulley and is mounted on the lawn mower by means of a mounting assembly including a mounting arm having one end pivotally secured to the mower and the other end movable towards and away from the pulley on the power take-off shaft of the power mower. An endless flexible member is entrained about the two pulleys and a spring is provided and connected between the mounting arm and the mower for resiliently tensioning the flexible member. The mounting assembly also includes a ratchet mechanism for retaining the mounting arm in adjusted positions against the pull of the tensioning spring whereby the mounting arm may be retained in a position with the flexible member in an untensioned state.

Many types of clipper attachments have been designed for use with power mowers, but most have been inconvenient to use either because the clipper heads were either fixedly secured to the power mower or the attachments were at least semi-permanently connected to an output shaft of the motor of the power mower thus making it inconvenient to disconnect the clipper attachment from the power mower.

The main object of this invention is to provide a clipper attachment for a power lawn mower utilizing a flexible cable having a cutter head mounted on one end with the other end of the flexible cable mounted on the mower in a manner whereby the motor of the power mower may be selectively engaged or disengaged from the clipper attachment whereby the attachment need operate only when it is desired to use the attachment.

Another object of this invention is to provide a clipper attachment for power lawn mowers that may be conveniently and easily adapted for use with substantially every type of power lawn mower now being produced.

Yet another object of this invention is to provide a clipper attachment which may be disconnected from the power source of the power lawn mower and positioned in an inoperative position which does not interfere with the normal use of the lawn mower.

Another object of this invention is to provide a means for resiliently urging the clipper attachment into operational engagement with the power source of the power lawn mower and also to provide a ratchet mechanism which may be engaged to retain the clipper attachment in an inoperational position disengaged from the power supply of the power lawn mower.

A final object to be specifically enumerated herein is to provide a clipper attachment which will conform to conventional forms of manufacture, be of simple construction and easy to operate so as to provide a device that will be economically feasible, long lasting and operable by substantially every person capable of operating a power lawn mower.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the clipper attachment shown mounted on a conventional form of rotary power mower;

FIGURE 2 is an enlarged fragmentary perspective view of the mounting assembly for the clipper attachment;

FIGURE 3 is an enlarged fragmentary side elevational view of a portion of the mounting assembly as seen from the left side of FIGURE 2;

FIGURE 4 is an enlarged top plan view of the cutter head of the clipper attachment;

FIGURE 5 is a transverse sectional view taken substantially upon the plane indicated by the section line 5—5 of FIGURE 4;

FIGURE 6 is an enlarged transverse vertical sectional view taken substantially upon the plane indicated by the section line 6—6 of FIGURE 4;

FIGURE 7 is an enlarged fragmentary sectional view of the mounting assembly showing the manner in which one end of the flexible cable is mounted for connection with the power take-off pulley of the power mower; and FIGURE 8 is an enlarged fragmentary sectional view taken substantially upon a plane passing through the longitudinal center line of the output shaft of the power source for the power mower.

Referring now more specifically to the drawings the numeral 10 generally designates the clipper attachment comprising the present invention which is shown in FIGURE 1 secured to a conventional form of rotary power mower generally referred to by the reference numeral 12.

The power mower 12 includes a body or housing 14 which is supported by a plurality of wheels 16 and has a motor generally referred to by the reference numeral 18 secured to the housing 14. The motor 18 includes power output shaft 20 which has a diametrically reduced threaded end portion 22 thereon. Disposed over the diametrically reduced end portion 22 and the adjacent end 23 of the output shaft 20 is a power take-off pulley 24 which abuts against the flywheel 26 of the motor 18 and is secured to the flywheel 26 by means of an internally threaded crankshaft nut 28. Interposed between the head 32 of the crankshaft nut 28 and the power take-off pulley 24 is a conventional form of starter rope sheave 32'.

The attachment 10 includes a flexible cable generally referred to by the reference numeral 34 which includes a tubular outer housing 36 and an inner cable or flexible shaft 38. The inner cable 38 is journalled through the housing 36 and there is secured to one end of the inner cable 38 an input or driven pulley 40. The input pulley 40 may be secured to the inner cable 38 in any convenient manner for rotation therewith.

The other end of the flexible cable 34 has secured thereto a cutter head assembly generally referred to by the reference numeral 42. The cutter head assembly 42 comprises a pair of elongated cutter blades 44 and 46 with the blade 44 being fixedly secured to the adjacent end of the outer housing 36 by means of a clamp structure generally referred to by the reference numeral 48. The clamp 48 comprises a lower clamp block 50 having an upwardly opening semi-circular notch 52 formed therein which is adapted to receive one-half of the cross-sectional area of the housing 36. The clamp 48 includes an upper clamp block 54 which has a downwardly opening semi-circular notch 56 formed therein which is adapted to cooperate with notch 52 formed in lower block 50 to embracingly clamp the end portion 37 of the outer housing 36. The lower block 53 is secured to the blade 44 in any convenient manner such as fastener 58 and the upper block 54 is secured to the lower block 50 by means of fasteners 60. Thus, the adjacent end of the outer housing 36 is fixedly secured to the stationary cutter blade 44.

The stationary cutter blade 44 is provided with an upstanding pivot pin generally referred to by the reference numeral 62 which is secured through an aperture 64 formed in blade 44 by means of welding 66. The free end of the pivot pin 62 is provided with a threaded outer portion 66 and the blade 46 is provided with a bore 68 which pivotally mounts the blade 46 for pivotal movement about the longitudinal axis of the pivot pin 62. A friction washer 70 is disposed over the pivot pin 62 in contacting relation with the blade 46 and a compression spring 72 is secured between the friction washer 70 and the outer end of the pivot pin 62 by means of threaded nut 74 and friction washer 76. Thus, the compression or thrust spring 72 resiliently urges the blade 46 into sliding contacting relation with the blade 42.

The end of the inner cable 38 adjacent the cutter assembly 42 has secured thereon by any convenient means a disk 78 which is provided with an outwardly extending off-center crank pin 80. An upstanding, substantially U-shaped slide bracket generally referred to by the reference numeral 82 is secured to the blade 46 by means of suitable fasteners 84 and is provided with two upstanding slide guides 86 which are provided with opposing concave slide surfaces 88 between which a slide 90 comprising convex ends is disposed. The slide 90 is provided with an aperture 92 which rotatably receives the pin 80 so that rotary movement of the inner cable 38 will effect vertical sliding and horizontal rocking or oscillating movement of the slide 90 and horizontal oscillating movement of the blade 46, see FIGURES 4 and 5. Thus, rotary movement of the iner cable 38 will effect oscillating movement of the blade 46 relative to the blade 42 to provide the clipping action.

The end of the flexible cable 34 remote from the cutter head assembly 42 is mounted upon the housing 14 by means of a mounting assembly generally referred to by the reference numeral 94. The mounting assembly 94 includes a mounting bracket 96 which is secured to the housing 14 by means of fasteners 98 and has secured thereto a pair of upstanding apertured supports 100 and 102. Carried by the upstanding supports 100 and 102 is a pivot shaft 104 which has one end of a mounting arm generally referred to by the reference numeral 106 secured thereto with the other end of the arm 106 being movable toward and away from the output shaft 20. Secured to the mounting arm 106 remote from the pivot shaft 104 is an apertured mounting block 108. Secured in the aperture 110 formed in the mounting block 108 is a cylindrical bushing 112 which receives therethrough pivot pin 114 that is carried by a swiveled bifurcated mounting flange, pulley block or yoke generally referred to by the reference numeral 116. The pivot pin 114 of the mounting flange 116 is secured through the bushing 112 by means of a threaded fastener 118. The bifurcated portion of the mounting flange 116 is provided with furcations 120 and 122 with the furcation 120 being provided with an aperture 124 having a bearing or bushing 126 disposed therein which rotatably receives the adjacent end of the inner cable 38. The furcation 122 is provided with a larger aperture 128 defined by a semi-circular notch 130 formed in the furcation 122 and a semi-circular notch 132 formed in cap 134. The cap 134 is secured to the furcation 122 by means of suitable fasteners 136 and it will be noted, see FIGURE 7, that the notches 130 and 132 embracingly engage the adjacent end of the outer housing 36. Thus, it will be seen that the input pulley 40 is mounted for rotation with the adjacent end of the inner cable 38 between the furcations 120 and 122.

A flexible member or endless belt 138 is entrained about the power take-off pulley 24 and the input pulley 40 and it will be noted that movement of the free end of the mounting arm 106 away from the output pulley 24 will tension the flexible member 138 and operatively connect the output pulley 24 with the input pulley 40. An expansion spring 140 is secured between an outer portion of the mounting arm 106 and the housing 14 to resiliently urge the arm 106 away from the output pulley 24 whereby the flexible member 138 will be tensioned. However, the clutch mechanism also includes a ratchet mechanism generally referred to by the reference numeral 142 which may be utilized to retain the mounting arm 106 in adjusted position relative to the output pulley 24 against the tension of the expansion ring 140. The ratchet mechanism 142 includes a toothed rack 144 formed on the upper portion of the support 102 which is engageable by a stop pin 146 that is pivotally secured to the mounting arm 106 by means of pin 148.

A hanger clamp 150 of suitable shape may be removably secured to either of the handles 152 of the mower 12 to provide a convenient place to secure the end of the flexible cable 34 adjacent the cutter head assembly 42 when it is not being used.

In operation, when it is desired to use the clipper attachment 10 the cutter head assembly 42 may be disengaged from the hanger 150 and the stop pin 146 may be manipulated to release the arm 106 whereby it will be urged away from the output pulley 24 by means of spring 140 until the flexible member 138 is tensioned thereby operatively connecting the output pulley 24 with the input pulley 40. The clipper attachment 10 may then be used to cut portions of a grass lawn or the like which are not accessible by the mower 12. After the clipper attachment 10 has been used, the handle 106 may be pulled toward the output pulley 24 a sufficient amount to release the tension of the flexible member 138 whereupon the stop pin 146 will retain the handle 106 in that position. The cutter head assembly 42 may then be again engaged with the hanger clamp 150 until the clipper 10 is again needed. Thus, it may be seen that the clipper attachment 10 may be readily engaged or disengaged with the motor 18 of the mower 14 with very little effort. Further, the flexible cable 34 of the attachment 10 greatly increases the versatility of the attachment in that it can be used in places which would not be accessible by the mower 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use on a power mower of the type including a power take-off pulley, a clipper attachment comprising an arm pivotally mounted on the mower and swingable toward and away from the power take-off pulley, a block mounted on said arm, a yoke swivelly mounted on said block, a clamp on one side of the yoke, a bearing in the other side of said yoke aligned with said clamp, a flexible shaft having one end portion passing through the clamp, traversing the yoke and journaled in the bearing, a flexible housing enclosing the shaft and having one end portion secured in the clamp, a pulley fixed on said one end portion of said shaft and operable in the yoke, an endless belt connecting the second named pulley to the power take-off pulley for actuation thereby, and a clipper head on the other end portion of the housing operatively connected to the shaft for actuation thereby.

2. For use on a power mower of the type including a power take-off pulley, a clipper attachment comprising an arm pivotally mounted on the mower and swingable toward and away from the power take-off pulley, a block mounted on said arm, a yoke swivelly mounted on said block, a clamp on one side of the yoke, a bearing in the other side of said yoke aligned with said clamp, a flexible shaft having one end portion passing through the clamp, traversing the yoke and journaled in the bearing, a flexible housing enclosing the shaft and having one end portion secured in the clamp, a pulley fixed on said one end portion of said shaft and operable in the yoke, an endless belt connecting the second named pulley to the power take-off pulley for actuation thereby, and a clipper head on the other end portion of the housing operatively connected to the shaft for actuation thereby, said clipper head including an elongated stationary blade, an elongated oscillating blade pivotally secured at an intermediate point on said stationary blade, coacting cutting teeth on one end portion of the blades, a clamp on the other end portion of the stationary blade engaged with said other end portion of the housing for mounting the clipper head thereon, and means operatively connecting the other end portion of the shaft to the oscillating blade.

3. For use on a power mower of the type including a power take-off pulley, a clipper attachment comprising an arm pivotally mounted on the mower and swingable toward and away from the power take-off pulley, a block mounted on said arm, a yoke swivelly mounted on said block, a clamp on one side of the yoke, a bearing in the other side of said yoke aligned with said clamp, a flexible shaft having one end portion passing through the clamp, traversing the yoke and journaled in the bearing, a flexible housing enclosing the shaft and having one end portion secured in the clamp, a pulley fixed on said one end portion of said shaft and operable in the yoke, an endless belt connecting the second named pulley to the power take-off pulley for actuation thereby, and a clipper head on the other end portion of the housing operatively connected to the shaft for actuation thereby, said clipper head including an elongated stationary blade, an elongated oscillating blade pivotally secured at an intermediate point on said stationary blade, coacting cutting teeth on one end portion of the blades, a clamp on the other end portion of the stationary blade engaged with said other end portion of the housing for mounting the clipper head thereon, and means operatively connecting the other end portion of the shaft to the oscillating blade, said means comprising an upstanding, generally inverted U-shaped bracket fixed transversely on the other end portion of said oscillating blade and including a pair of spaced, opposed, vertical concave guides, a slide comprising convex ends mounted for vertical sliding and horizontal rocking movement between said guides and having an opening therein, a disk fixed on the shaft, and an off-center pin on said disk journaled in the opening.

4. For use on a power mower of the type comprising a power take-off pulley, a clipper attachment including a flexible tubular housing, a flexible shaft rotatable in said housing, means for operatively connecting said shaft at one end to the power take-off pulley for actuation thereby, and a clipper head on one end portion of the housing and operatively connected to the shaft at the other end thereof for actuation thereby, said clipper including an elongated stationary blade, an elongated oscillating blade pivotally secured at an intermediate point on said stationary blade, coacting cutting teeth on one end portion of the blades, a clamp on the other end portion of the stationary blade engaged with said one end portion of the housing for mounting the clipper head thereon, and means operatively connecting the other end portion of the shaft to the oscillating blade for actuating same, said means including an essentially U-shaped guide on the oscillating blade, a block slidable and rockable in said guide, and an off-center pin on said other end of said shaft journaled in said block.

References Cited in the file of this patent
UNITED STATES PATENTS

| | | |
|---|---|---|
| 1,032,485 | Karcher | July 16, 1912 |
| 2,771,730 | True | Nov. 27, 1956 |
| 2,778,183 | Evans | Jan. 22, 1957 |
| 2,790,292 | Trecker | Apr. 30, 1957 |
| 2,888,084 | Trecker | May 26, 1959 |